UNITED STATES PATENT OFFICE.

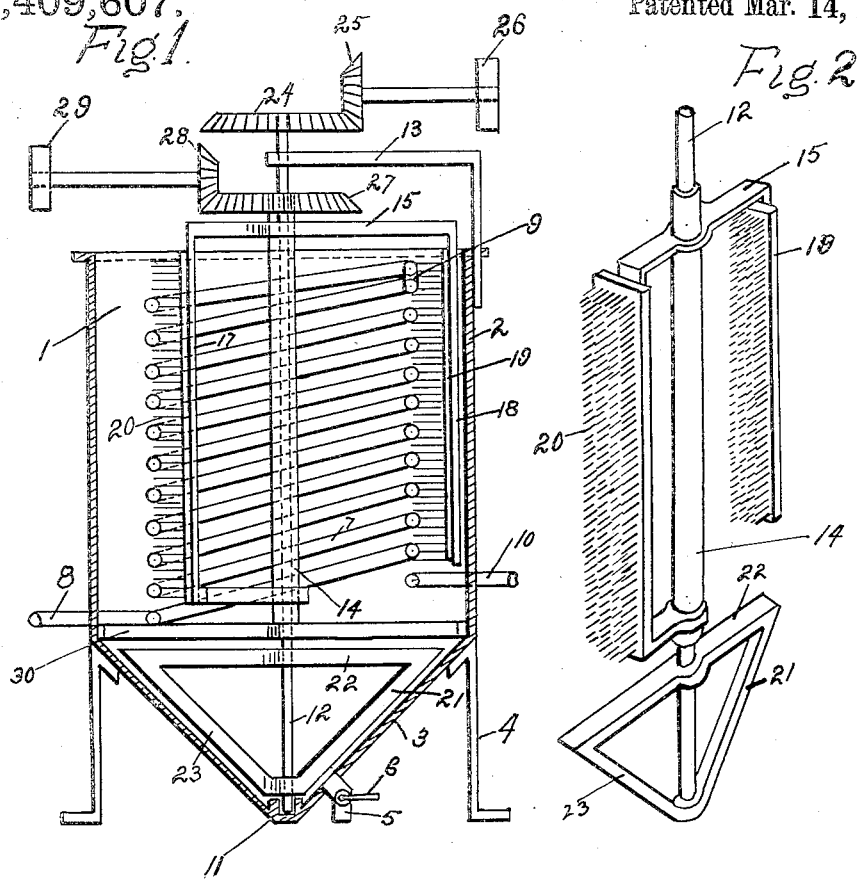
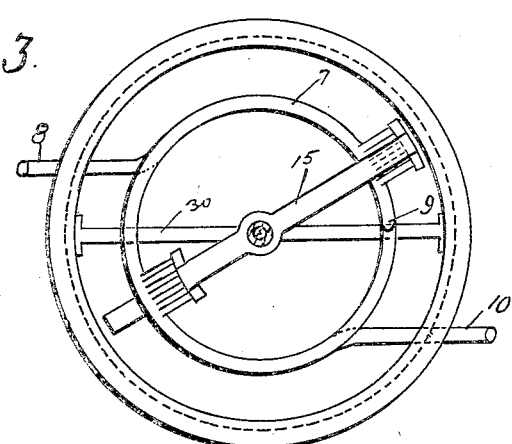

TRUMAN E. STEVENS, OF OMAHA, NEBRASKA, ASSIGNOR TO POTASH REDUCTION COMPANY, OF HOFFLAND, NEBRASKA, A CORPORATION OF NEBRASKA.

CRYSTALLIZER.

1,409,607.   Specification of Letters Patent.   Patented Mar. 14, 1922.

Application filed July 7, 1921. Serial No. 483,008.

*To all whom it may concern:*

Be it known that I, TRUMAN E. STEVENS, a citizen of the United States, residing at Omaha, in the county of Douglas and State of Nebraska, have invented new and useful Improvements in Crystallizers, of which the following is a specification.

This invention relates to crystallizers and more particularly to that type of crystallizer in which crystallization is forced from hot solutions of soluble salts by means of a cooling medium, and is a modification of the invention which forms the subject matter of my companion application Serial Number 483,006, July 7, 1921.

One of the obstacles to successful operation of crystallizers of this type when used with solutions of salts such as sodium carbonate, sodium sulphate etc. which have the property when crystallizing of adhering to adjacent surfaces is that the crystals of such salts, as they form, adhere to the surface of the conduit carrying the cooling medium, building up a heat insulating layer which progressively decreases the cooling efficiency of said cooling medium up to the point where it is rendered practically ineffective to force further crystallization.

One of the objects of the invention is to provide a tank in which the process of crystallization from hot solutions of soluble salts is carried out by means of a refrigerating coil immersed in the solution in said tank, the walls of which afford a surface to which the crystals adhere as formed, means being provided for mechanically removing the crystals from the surface of the said coil as fast as they are formed.

Another object of the invention is to provide means for agitating the solution during the crystallization period for the purpose of maintaining uniform the density of the whole body of liquid within the tank.

My invention is hereinafter more fully described in connection with the accompanying drawings. Objects of a more specific nature will become apparent in the description and the essential characteristics are summarized in the claims.

Figure 1 is a front elevation partly in section of the apparatus which constitutes my invention.

Figure 2 is a perspective view of the crystal remover and agitator.

Figure 3 is a top plan view of the tank shown in Figure 1 taken in a plane just below the gears.

In the drawing the numeral 1 represents a tank having the cylindrical side wall 2 and the conical bottom 3. The tank is supported upon brackets 4 and is provided with a drain pipe 5 communicating with the lower conical portion of said tank and controlled by a cock 6. Mounted within the cylindrical portion of the tank and concentric thereto is a refrigerating coil 7 comprising a pipe 8 which enters near the bottom of the cylindrical portion of said tank, winds helically upward then bends upon itself as at 9 and continues helically downward leaving the tank near the bottom of the cylindrical portion as at 10. A refrigerating medium such as cold water or liquid ammonia is continuously circulated through the coil.

Within the bottom of the tank is a recess 11 forming a lower journal for the shaft 12 which extends axially through the tank and is journalled at its upper end in a bearing in the bracket 13 which is secured to the wall of the tank.

Surrounding that part of the shaft 12 which lies within the cylindrical portion of the tank and rotatably mounted thereon is the hollow outer shaft 14 having the lower end thereof abutting the transverse brace 30 which latter acts as an additional bearing for the shaft 12. Supported in fixed relation to this shaft is the frame member 15 having downwardly extending arms 17 and 18 each of which carries a brush comprising a back 19 in which are secured stiff fibers or wires 20. The frame member 15 is so proportioned in length on either side of the outer shaft 14 that the brush depending from one side will engage the outer surface of the refrigerating coil and that the brush depending from the other side will engage the inner surface of said coil when said brushes are rotated. The fibers or wires of which the brushes are constructed are of sufficient length to extend between the individual coils of said helical coil in order to engage the upper and lower surface of said coils. In this way the entire surface of said coils is reached by the brushes and the crystals removed from all parts thereof. Additional support is given to the brush carrying frame by the brace 31, which is secured between the depending arm 17 and the shaft.

Mounted fixedly upon the shaft 12 and lying within the conical portion of the tank is an agitator 21 which consists of a cross member 22 having sloping sides 23 which conform to the sloping of the conical bottom of the tank and are adapted to rotate in proximity thereto.

The object of the agitator 21 is to mix the concentrated solution in the unrefrigerated portion of the tank with the more depleted solution from which crystallization is taking place.

The inner shaft 12 is positively driven by means of a gear 24 keyed to its upper end meshing with a gear 25 driven by the pulley 26 from any suitable source of power. The outer shaft 14 is likewise driven through a train of gears 27 and 28 by means of a pulley 29 actuated from the source of power. The shafts are independently revoluble and the agitator 21 is preferably driven in a direction contrary to that of the brushes 20 for the purpose of more thoroughly mixing the solution so that the whole body of said solution shall be of substantially the same density during the process of crystallization.

Although I have thus described the preferred embodiment of my invention, it is evident that those skilled in the arts to which this relates may make various changes in the construction, combination and arrangement of the several parts without departing from the spirit and scope of the invention.

Having described my invention what I claim as new and desire to secure by Letters Patent is:—

1. A crystallizer including a tank, a refrigerating coil within said tank providing a crystallizing surface and means for removing crystals from said surface comprising a shaft rotatable axially of said coil, and brushes mounted on said shaft and engaging both the inside and outside surface of said coil.

2. A crystallizer including a tank, a helical refrigerating coil mounted within said tank having an inlet and outlet arranged at the lower end of said coil, said coil providing a crystallizing surface and means for removing crystals from said surface comprising a shaft rotatable axially of said coil, and brushes mounted on said shaft and engaging both the inside and outside surfaces of said coil.

3. A crystallizer comprising a tank, a refrigerating unit comprising a pipe entering said tank at the bottom and coiled into an ascending and descending cylindrical helix, a pair of brushes engaging said pipe on the inside and outside of said helical coil for removing crystals therefrom and means for rotating said brushes.

4. A crystallizer comprising a tank, a cylindrical refrigerating coil mounted therein providing a crystallizing surface, a shaft journalled in said tank axially of said coil, a transverse frame member secured to said shaft and extending radially on opposite sides thereof, one side extending beyond said coil and carrying a wiper which faces the outer surface of said coil for engagement therewith, the other side being shorter than the radius of said coil and carrying a wiper facing the inner surface of said coil for engagement therewith and means for rotating said shaft.

5. A rotatable crystal removing element for crystallizers comprising a shaft, a member carried radially of said shaft on opposite sides thereof having arms of unequal length, a brush carried by each arm and extending longitudinally of said shaft, the brush carried by the longer arm facing inwardly and the brush carried by the shorter arm facing outwardly, the faces of said brushes when rotated describing cylinders of revolution spaced apart and adapted to accommodate a crystallizing coil therebetween.

6. A crystallizer comprising a tank having a cylindrical side wall and a conical bottom, a cylindrical refrigerating coil mounted within the cylindrical portion of said tank and providing a crystallizing surface, a hollow shaft journalled in said tank axially of said coil, a transverse frame member secured to said hollow shaft and extending radially on opposite sides thereof, one side extending beyond said coil and carrying a brush which faces the outer surface of said coil for engagement therewith the other side being shorter than the radius of said coil and carrying a wiper facing the inner surface of said coil for engagement therewith, means for rotating said shaft, an inner shaft rotatably mounted within said hollow shaft and journalled at its lower end in a recess in the conical bottom of said tank, an agitator carried by said inner shaft within said conical bottom portion and means for rotating said inner shaft independently of said hollow shaft.

In testimony whereof I have hereunto set my hand in presence of two subscribing witnesses.

TRUMAN E. STEVENS.

Witnesses:
F. W. KOCH,
G. R. STEVENSON.